United States Patent
Siqueira et al.

(10) Patent No.: US 9,796,316 B1
(45) Date of Patent: Oct. 24, 2017

(54) ADJUSTABLE-HEIGHT CUP HOLDER ASSEMBLIES WITH SHALLOW CUP RECEPTACLES FOR MOTOR VEHICLES

(71) Applicant: GM GLOBAL TECHNOLOGY OPERATIONS LLC, Detroit, MI (US)

(72) Inventors: Fernando A. Siqueira, Sao Bernardo do Campo (BR); Adelchi R. Tiboni, Sao Paulo (BR)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/173,022

(22) Filed: Jun. 3, 2016

(51) Int. Cl.
  *B60R 11/06*    (2006.01)
  *B60N 3/10*     (2006.01)
  *B60N 2/46*     (2006.01)

(52) U.S. Cl.
  CPC .......... *B60N 3/106* (2013.01); *B60N 2/4613* (2013.01); *B60N 3/102* (2013.01)

(58) Field of Classification Search
  CPC ........ B29C 66/71; B60N 3/102; B60N 3/101; B60N 3/106; B60N 2/4613; Y10T 29/49826; B29K 2023/12; A47G 19/2205; F21Y 2115/10; A47C 1/02; A47C 1/12; A47C 7/62
  USPC ...................... 296/37.8, 24.34; 220/739, 737; 248/311.2; 224/926; 206/217
  See application file for complete search history.

(56) References Cited

U.S. PATENT DOCUMENTS

| | | | | |
|---|---|---|---|---|
| 5,143,337 A | * | 9/1992 | Tomayko, Jr. ......... | B60N 3/103 108/44 |
| 5,289,962 A | * | 3/1994 | Tull ....................... | B60N 3/102 211/41.2 |
| 5,398,898 A | * | 3/1995 | Bever ................ | A47G 23/0225 248/154 |
| 5,489,055 A | * | 2/1996 | Levy ....................... | B60N 3/103 224/544 |
| 5,527,008 A | * | 6/1996 | Schutter ................ | B60N 3/106 224/926 |
| 5,704,579 A | * | 1/1998 | Celentino ............. | B60N 3/106 224/926 |
| 6,095,058 A | * | 8/2000 | Earnhart .............. | A47B 23/002 108/43 |
| 6,196,434 B1 | * | 3/2001 | Angran .................. | B60N 3/103 224/549 |

(Continued)

*Primary Examiner* — Kiran B Patel
(74) *Attorney, Agent, or Firm* — Quinn IP Law

(57) ABSTRACT

Disclosed are adjustable-height vehicle cup holder assemblies, methods for making and methods for using such assemblies, and motor vehicles with adjustable-height cup holder assemblies. A cup holder assembly is disclosed for receiving and supporting a container, such as a beverage cup or bottle, in a motor vehicle. The cup holder assembly includes a receptacle tray that attaches to the motor vehicle's internal vehicle structure, such as a pivotable armrest. One or more cup receptacles are recessed from the top surface of the receptacle tray. Each cup receptacle nests therein a container. One or more retractable retainer tabs are rotatably coupled to the receptacle tray, adjacent each cup receptacle. Each retainer tab pivots between a retracted position, whereat the retainer tab lays against the receptacle tray's top surface, and an extended position, whereat the retainer tab projects from the top surface such that the retainer tab sits against the container.

14 Claims, 3 Drawing Sheets

(56) References Cited

U.S. PATENT DOCUMENTS

| | | | | |
|---|---|---|---|---|
| 6,234,439 B1* | 5/2001 | Townsend | B60N 3/102 | 248/309.1 |
| 6,349,913 B1* | 2/2002 | Jankowski | B60N 3/108 | 224/281 |
| 6,427,960 B1* | 8/2002 | Gehring | B60N 2/4686 | 224/926 |
| 7,140,660 B2* | 11/2006 | Oana | B60N 3/102 | 224/926 |
| 8,485,680 B2* | 7/2013 | Anderson | B60N 3/108 | 224/926 |
| 9,539,942 B2* | 1/2017 | Salter | H05B 37/0227 | |
| 9,657,890 B2* | 5/2017 | Botello | F16M 13/02 | |
| 2003/0019993 A1* | 1/2003 | Yamada | B60N 3/102 | 248/311.2 |
| 2006/0071497 A1* | 4/2006 | Radu | B60N 2/46 | 296/24.34 |
| 2009/0001090 A1* | 1/2009 | Karam | B65D 1/265 | 220/669 |
| 2009/0175049 A1* | 7/2009 | Lota | B60N 3/101 | 362/488 |
| 2011/0187144 A1* | 8/2011 | Kwolek | B62D 25/14 | 296/37.8 |
| 2011/0240697 A1* | 10/2011 | Stephens | B60N 3/002 | 224/400 |
| 2011/0240810 A1* | 10/2011 | France | B60N 3/102 | 248/220.21 |
| 2012/0194052 A1* | 8/2012 | Mclaughlin | B60N 3/105 | 312/312 |
| 2013/0038097 A1* | 2/2013 | Oldani | B60N 3/105 | 297/188.14 |
| 2013/0092808 A1* | 4/2013 | Adachi | A47G 23/0216 | 248/311.2 |
| 2013/0134266 A1* | 5/2013 | Lai | A47G 23/0225 | 248/104 |
| 2013/0170682 A1* | 7/2013 | Conrad | H04R 1/028 | 381/332 |
| 2014/0252820 A1* | 9/2014 | Botello | F16M 13/02 | 297/188.04 |
| 2014/0346802 A1* | 11/2014 | Horton | B60R 11/00 | 296/37.8 |
| 2015/0291104 A1* | 10/2015 | Kearney | B60R 7/04 | 296/37.12 |
| 2016/0193967 A1* | 7/2016 | Hipshier | B60N 3/10 | 296/37.8 |
| 2016/0242564 A1* | 8/2016 | Cass | A47C 31/00 | |
| 2017/0135489 A1* | 5/2017 | Seidl | A47C 7/68 | |

* cited by examiner

US 9,796,316 B1

ADJUSTABLE-HEIGHT CUP HOLDER ASSEMBLIES WITH SHALLOW CUP RECEPTACLES FOR MOTOR VEHICLES

TECHNICAL FIELD

The present disclosure relates generally to cup holders for motor vehicles. More specifically, aspects of this disclosure relate to cup holder assemblies for a pivotable armrest of a rear seatback of an automobile.

BACKGROUND

Current production motor vehicles, such as the modern-day automobile, are originally equipped with assorted cup holders that are incorporated into different areas of the vehicle's passenger compartment. These cup holders are generally intended to provide a stable receptacle for securely retaining a container, such as a beverage can, bottle, or cup, in an upright position during vehicle operation. This is particularly important for the driver who requires the use of both hands to properly operate the vehicle. Cup holders have taken various forms, such as recessed receptacles formed into the instrument panel or center console, and similarly located trays fabricated with cup receiving apertures. Other types of cup holder assemblies are designed to transition from an extended position, projecting from the instrument panel or center console, to a retracted position, stowed inside the instrument panel/center console thus allowing the cup holder to be moved out of the way when not in use.

Cup holders are often provided in vehicles for both front and rear passengers, mounted in such diverse locations as underneath the dash board, assembled into the passenger's vehicle door, or projecting rearwardly from the center console elevated from the rear floor board. In one specific example, a cup holder assembly may be incorporated into an armrest assembly of a rear bench-style seat, wherein the armrest assembly is movable between a raised "stowed" position and a lowered "use" position. In addition, many cup holder assemblies are designed to receive and retain containers of varying sizes. For example, some cup holder assemblies include flexible tabs that project from an interior surface of a receptacle frame to support therein containers of differing girths and depths. Another approach is to use spring loaded, semi-circular articulating arms that are adjustable to grip the OD surface of containers of varying diameters.

SUMMARY

Disclosed herein are adjustable-height vehicle cup holder assemblies, methods for making and methods for using such cup holder assemblies, and motor vehicles with an adjustable-height cup holder assembly. By way of example, and not limitation, a novel cup holder assembly for the stowable armrest of a rear seatback is disclosed. The cup holder assembly is composed of a shallow receptacle tray (e.g., approximately 30-35 mm deep) that is mounted on the upper surface of the armrest. Retractable retainer tabs are rotatably coupled to the receptacle tray for selectively increasing the height of each cup receptacle when the armrest is opened and the cup receptacle is in use. As a container is inserted into the cup receptacle, the container presses on bottom ends of the retainer tabs. In so doing, each tab is pivoted to an extended position whereat the tab projects generally orthogonally from the receptacle tray and sits against the periphery of the container, e.g., increasing the cup receptacle height by 100% or more. When the cup receptacle is not in use, the retainer tabs are disproportionately top-weighted to automatically pivot, under the force of gravity, to a retracted position. Once in the retracted position, the tab is recessed below or flush with the top surface of the receptacle tray such that the armrest and cup holder assembly can be stowed within the seatback.

To ensure proper restraint of the container, each cup receptacle can be provided with multiple retainer tabs spaced circumferentially around the perimeter of the receptacle's upper opening. With this configuration, the circumferentially spaced retainer tabs press against numerous discrete contact points of a single container. To increase the contact area between the retainer tabs and the container, each tab can be formed within an oblong shape having a wider top portion whereat the tab contacts the container. To simplify assembly, the retainer tabs are provided with pivot arms that snap-lock into complementary slots in the receptacle tray (eliminating the need for adhesives, mounting brackets, and fasteners). The tabs can be selectively positioned, e.g., offset from top center ("12 o'clock") and bottom center ("6 o'clock"), to ensure that the tabs stay stowed while the armrest is closed. Alternatively, the seatback may be provided with a tab interface that automatically moves each tab to their respective retracted position when the armrest is closed.

Attendant benefits for at least some of the disclosed concepts include the ability to integrate a cup holder assembly into a thin armrest that is stowable within the seatback of a bench seat. Thin armrests offer very limited packaging space, which made it prohibitive to incorporate large and complex prior cup holder designs. In addition, a shallow receptacle tray helps to reduce the packaging space required for stowing the armrest assembly and the cup holder assembly. By minimizing the overall size of the armrest assembly and cup holder assembly, material costs and vehicle weight is concomitantly reduced. Reduced packaging space and vehicle weight, in turn, leads to increased fuel economy. The simplified design of the cup holder assembly and concomitant elimination of dedicated parts for assembling an adjustable-height cup holder helps to reduce part costs, assembly time, and manufacturing costs.

Aspects of the present disclosure are directed to adjustable-height cup holder assemblies with shallow cup receptacles. Disclosed, for example, is a cup holder assembly for receiving and supporting a container in a motor vehicle. The cup holder assembly includes a receptacle tray that is configured to attach to internal vehicle structure of the motor vehicle, such as a stowable armrest assembly or a center console. The receptacle tray includes a top platform and a cup receptacle that is recessed from the top platform. The cup receptacle is configured to nest therein a container, such as a beverage cup or bottle. One or more retractable retainer tabs are rotatably coupled to the receptacle tray, positioned adjacent the cup receptacle. Each retainer tab is configured to pivot between a retracted position, whereat the retainer tab lays against the top platform of the receptacle tray, and an extended position, whereat the retainer tab projects from the top platform of the receptacle tray such that the retainer tab sits against the container.

Other aspects of the present disclosure are directed to motor vehicles employing adjustable-height cup holder assemblies. A "motor vehicle," as used herein, may include any relevant vehicle platform, such as passenger vehicles (internal combustion engine (ICE), hybrid, electric, fuel cell, etc.), commercial vehicles, industrial vehicles, military vehicles, all-terrain vehicles (ATV), farm equipment, motorcycles, boats, airplanes, space shuttles, etc. In one example, a motor vehicle is disclosed that includes a vehicle body with a passenger compartment. An armrest assembly is pivotably mounted inside the passenger compartment, and a cup holder assembly is rigidly attached to the armrest.

The cup holder assembly in the foregoing example includes a receptacle tray that is mounted on the armrest assembly. The receptacle tray includes a top platform and a pair of cup receptacles recessed from the top platform. Each cup receptacle has an inner wall and is configured to nest therein a container. A respective plurality of retractable retainer tabs is positioned adjacent each of the cup receptacles. Each of these retainer tabs has an elongated tab body that is rotatably coupled to the receptacle tray. Each retainer tab pivots between a retracted position and an extended position. When in the retracted position, an upper portion of the elongated tab body lays flat against the top surface of the receptacle tray, recessed into a complementary tab pocket. Conversely, when in the extended position, a lower portion of the elongated tab body presses against the inner wall of the cup receptacle and the upper portion projects orthogonally from the top surface of the receptacle tray such that the retainer tab sits against the container.

According to other aspects of the present disclosure, methods of making and methods of using adjustable-height vehicle cup holder assemblies are presented. For instance, a method is disclosed for constructing a cup holder assembly for receiving and supporting a container in a motor vehicle. The method includes: forming a receptacle tray that is configured to attach to the motor vehicle's internal vehicle structure, the receptacle tray being formed with a top platform and a cup receptacle recessed from the top platform, the cup receptacle being configured to nest therein the container; and rotatably attaching a plurality of retractable retainer tabs to the receptacle tray such that each of the retainer tabs selectively pivots between a retracted position, whereat the retainer tab lays against the top platform of the receptacle tray, and an extended position, whereat the retainer tab projects from the top platform of the receptacle tray such that the retainer tab sits against the container.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and modes for carrying out the present disclosure when taken in connection with the accompanying drawings and the appended claims.

Figure 1:
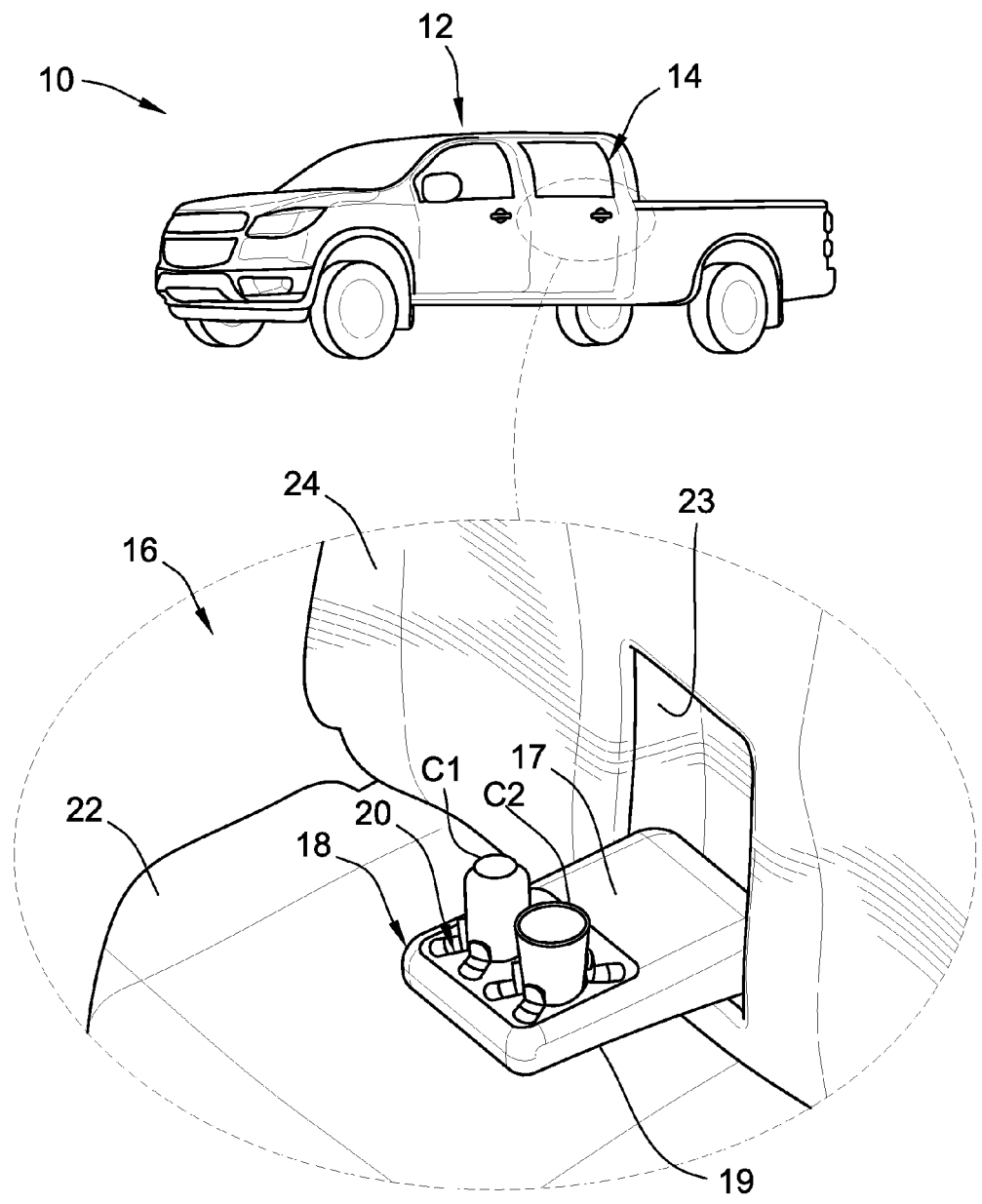
FIG. 1 is a side perspective-view illustration of a representative motor vehicle with an inset perspective-view of a crew cab bench seat with an armrest having a cup holder assembly in accordance with aspects of the present disclosure.

The present disclosure is susceptible to various modifications and alternative forms, and some representative embodiments have been shown by way of example in the drawings and will be described in detail herein. It should be understood, however, that the novel aspects of this disclosure are not limited to the particular forms disclosed. Rather, the disclosure is to cover all modifications, equivalents, combinations, subcombinations, and alternatives falling within the spirit and scope of the disclosure as defined by the appended claims.

DETAILED DESCRIPTION OF THE ILLUSTRATED EMBODIMENTS

This disclosure is susceptible of embodiment in many different forms. There are shown in the drawings and will herein be described in detail representative embodiments of the disclosure with the understanding that the present disclosure is to be considered as an exemplification of the principles of the disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Referring now to the drawings, wherein like reference numbers refer to like features throughout the several views, there is shown in FIG. 1 an illustration of a representative automobile, designated generally at 10 and portrayed as an extended cab pickup truck, in accordance with aspects of the present disclosure. Mounted at a medial portion of the automobile 10, inside the passenger compartment 12 between opposing door assemblies 14, is a vehicle cup holder assembly 20. The illustrated automobile 10—also referred to herein as "motor vehicle" or "vehicle" for short—is merely an exemplary application with which the novel aspects of this disclosure can be practiced. In the same vein, the implementation of the present concepts into an armrest assembly of a rear passenger bench, as will be described in further detail below, should also be appreciated as an exemplary application of the novel concepts disclosed herein. As such, it should be understood that the aspects and features of the present disclosure can be incorporated into other vehicle structure, integrated into other locations within the passenger compartment, and utilized for any logically relevant type of motor vehicle. Lastly, the drawings presented herein, are not necessarily to scale and are provided purely for instructional purposes. Thus, the specific and relative dimensions shown in the drawings are not to be construed as limiting.

Referencing the inset view of FIG. 1, within the passenger compartment 12 of the motor vehicle 10 there is mounted one or more seat assemblies 16 for supporting occupants of the vehicle 10. While the seat assembly 16 may take on any now known or hereinafter developed variant relevant to motor vehicles, such as bucket and bench seats, electric and manual seats, driver and passenger seats, etc., the illustrated example is a rear passenger bench-style seat assembly 16 for the crew cab of a pickup truck 10. The seat assembly 16 is basically composed of a seat base 22 that is rigidly secured, for example, to the vehicle frame (not visible in the views provided), and a seatback 24 that is operatively connected to the seat base 22. Both the seat base 22 and seatback 24 can comprise components and features typical to seat assemblies, such as cushions of various designs, materials, and durometer (e.g., Shore A or OO) ratings, an internal support structure, as well as any requisite mechanical or electromechanical hardware for folding, adjusting or otherwise generally moving segments of the seat assembly 16.

Seatback 24 of FIG. 1 is provided with a recessed armrest cavity 23 for stowing therein a pivotable armrest assembly 18. The armrest assembly 18 can be of any shape, size and style desired for the intended application of the disclosed features. For the embodiment shown, the armrest assembly 18 is of a "thin" construction (e.g., approximately 50-80 mm thick) with a generally hexagonal body including opposing first and second surfaces 17 and 19, respectively. A rear segment of the armrest assembly 18 is provided with a mounting hinge, swivel bracket, or other coupling mechanism (not shown) for pivotably attaching to the seat assembly 16 such that the armrest assembly 18 can be raised (closed) and lowered (opened). When the armrest assembly 18 is lowered to its use/open position projecting in a cantilevered fashion from the cavity 23, as seen in FIG. 1, the first (arm) surface 17 is accessible to support thereon at least a portion of an occupant's forearm. Conversely, when the armrest assembly is raised to its stow/close position nested within the cavity 23, the second (back) surface 19 is accessible to provide back support for at least a portion of the weight of an occupant's lumbar region.

A cup holder assembly 20 is mounted towards a forward end of the armrest assembly 18 to provide a stable receptacle for securely retaining one or more containers, such as beverage cans, bottles, or cups, in an upright position during use of the vehicle 10. In its simplest form, the cup holder assembly 20 shown in FIGS. 2A and 2B can consist essentially of a receptacle tray 26 and a plurality of retractable retainer tabs 28. As seen in FIG. 3, the receptacle tray 26 can be integrally formed (e.g., injection, compression, or blow molded from a thermoplastic polymer) as a single-piece, unitary structure with a generally rectangular upper platform 30 having round-chamfered corners, and a pair of cylindrical cup receptacles 32A and 32B recessed from a top-most surface of the platform 30. The receptacle tray 26 attaches, e.g., via snap fasteners, threaded fasteners, adhesives, etc., to the armrest assembly 18 or other internal vehicle structure of the motor vehicle 10 depending, for example, on the desired location of the cup holder assembly 20.

Each cup receptacle 32A, 32B includes a discrete circular base 31A and 31B with an inner sidewall 33A and 33B respectively connecting the base 31A, 31B to the upper platform 30. The base 31A, 31B and sidewall 33A, 33B of a cup receptacle 32A, 32B cooperatively circumscribe, support, and nest therein a container C1 or C2 (FIG. 1). It should be appreciated that the number, shape, size and arrangement of the cup receptacles can be varied, singly or in any combination, from that which is shown in the drawings. An optional arcuate depression 34 is interposed between the two cup receptacles 32A, 32B to accommodate a mug handle or to facilitate retrieval of objects from the receptacles, as some non-limiting use examples. When the cup holder assembly 20 is mounted on the armrest assembly 18, the top surface of the upper platform 30, which includes upper openings 35A and 35B of the cup receptacles 32A, 32B, can be generally flush with the first (arm) surface 17 of the armrest 18.

Turning back to FIGS. 2A and 2B, a first arrangement 28A of retractable retainer tabs 28 is positioned adjacent the first cup receptacle 32A, while a second arrangement 28B of retractable retainer tabs 28 is positioned adjacent the second cup receptacle 32B. According to the illustrated example, each cup receptacle 32A, 32B has a generally circular upper opening 35A and 35B (FIG. 3), respectively, through which a container is received; four retractable retainer tabs 28 are spaced circumferentially around the perimeter of each of these upper opening 35A, 35B. The tabs 28 can be offset, e.g., approximately 15-35 degrees clockwise or counterclockwise, from a medial plane extending diametrically through the center of each cup receptacle 32A, 32B. Recognizably, the number and arrangement of retainer tabs for each cup receptacle can be altered from that which is shown in the drawings. By way of non-limiting example, it is envisioned that a cup receptacle can be provided with a single or a pair of enlarged retainer tabs disposed at forward and/or rearward sides of the opening; alternatively, each cup receptacle can be provided with three to ten equidistantly spaced, reduced-size retainer tabs.

Figure 3:
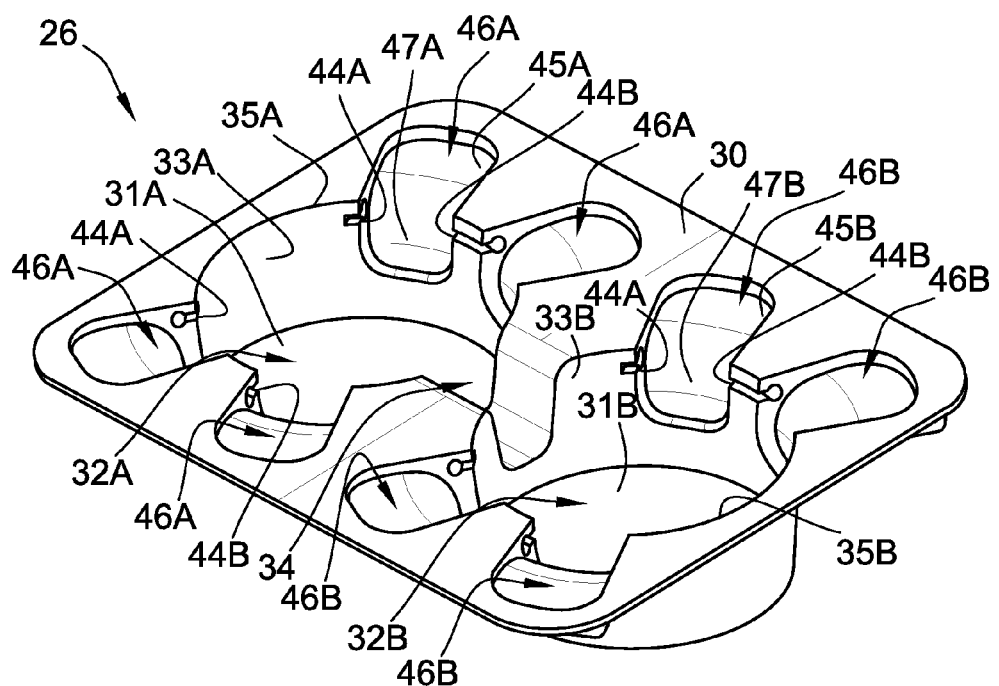
FIG. 3 is an elevated perspective-view illustration of the receptacle tray of the representative cup holder assembly of FIG. 1.
Figure 4:
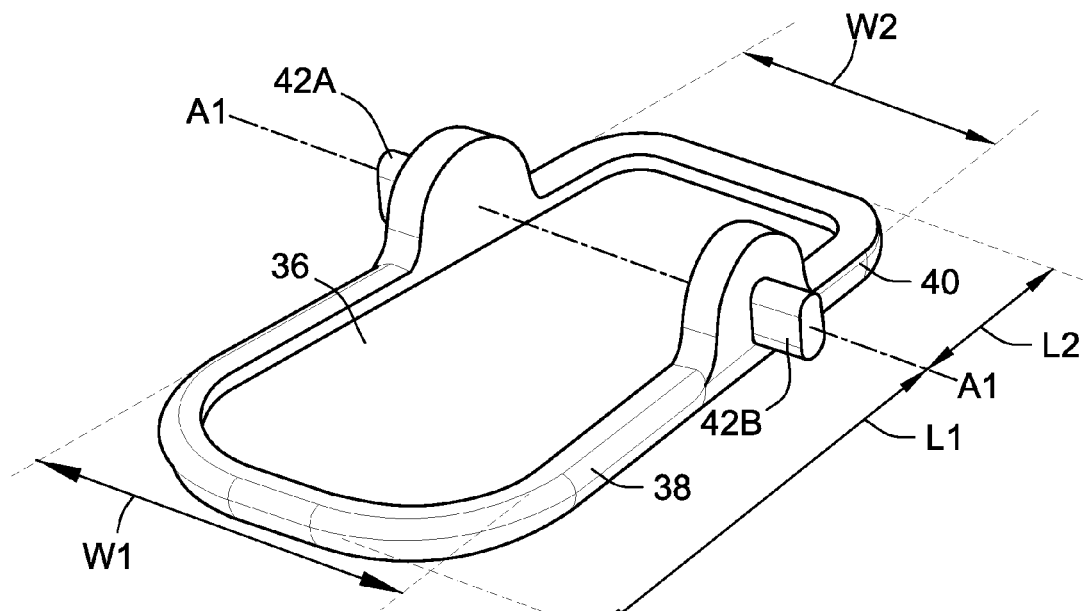
FIG. 4 is a perspective-view illustration of one of the movable retainer tabs of the representative cup holder assembly of FIG. 1.

While not per se required, it is desirable, for at least some embodiments, that the retainer tabs 28 be substantially structurally identical; thus, for brevity and conciseness, all of the retainer tabs 28 can be described in additional detail with reference to the representative configuration illustrated in FIG. 4. Each retainer tab 28 includes an elongated, oblong tab body 36 with a first (upper) portion 38 integrally formed with and adjacent to a second (lower) portion 40. One or more pivot arms—e.g., first and second pivot arms 42A and 42B, respectively—are integrally formed with and interposed between the upper and lower portions 38, 40 of the tab body 36. These pivot arms 42A, 42B project transversely from opposing sides of the elongated tab body 36 along a pivot axis A1. The receptacle tray is formed with multiple pairs of (first and second) complementary slots 44A and 44B (FIG. 3), respectively, into which these pivot arms 42A, 42B are respectively snap-locked into place. Once the pivot arms 42A, 42B are properly snap-locked into place, the tab body 36 can rotate about pivot axis A1.

Figure 2A:
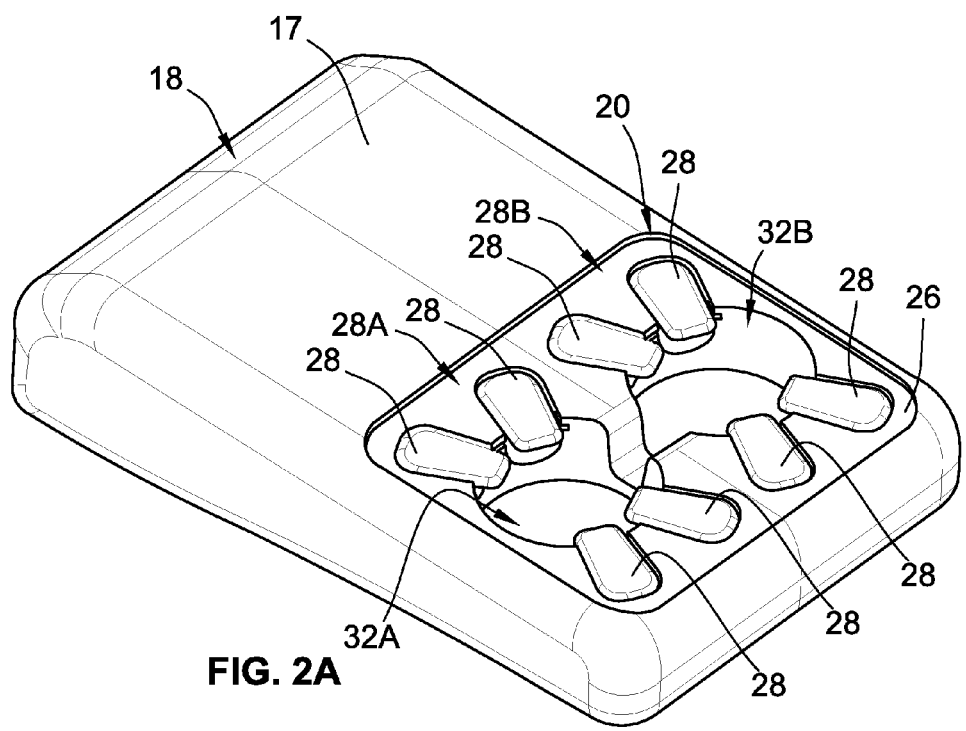
FIGS. 2A and 2B are elevated perspective-view illustrations of the representative armrest and cup holder assembly of FIG. 1 showing the movable retainer tabs in retracted and extended positions, respectively.
Figure 2B:
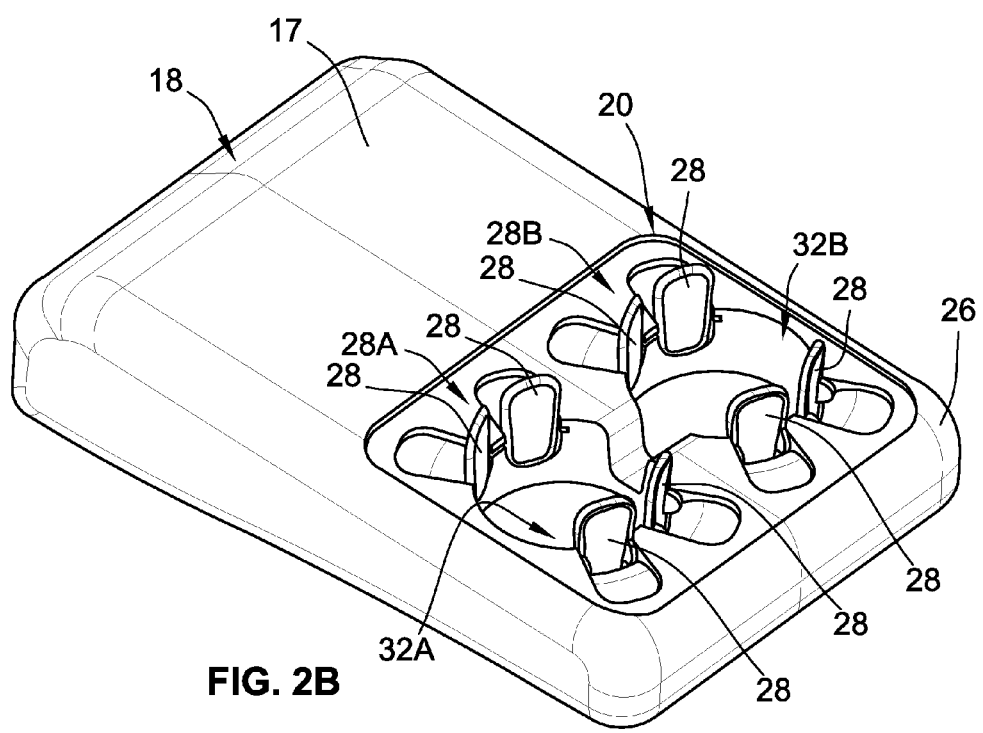

Each retainer tab 28 is operable to rotate about pivot axis A1 between a retracted position, as best seen in FIG. 2A, and an extended position, as best seen in FIG. 2B. When a retainer tab 28 is in its retracted position, the upper portion 38 of the tab body 36 lays against the top surface of the receptacle tray 26, whereas the lower portion 40 of the tab 28 protrudes radially inward towards the center of a corresponding cup receptacle 32A, 32B. In accordance with the illustrated example, the receptacle tray 26 can be formed with a first plurality of recessed tab pockets 46A spaced circumferentially around the first cup receptacle 32A, and a second plurality of recessed tab pockets 46B spaced circumferentially around the second cup receptacle 32B. Each of these tab pockets 46A, 46B is composed of an upper pocket portion 45A and 45B, respectively, that is connected to and angularly offset from a lower pocket portion 47A and 47B, respectively. The upper pocket portion 45A, 45B, which is recessed from the top surface of the platform 30, nests therein the upper portion 38 of an elongated tab 28. With this design, retracted retainer tabs 28 can lay generally flush with or recessed below the top surface of the upper platform 30. The number, shape, size and arrangement of the pockets 46A, 46B can be modified, for example, to accommodate corresponding modifications to the retractable retainer tabs 28.

When a retainer tab 28 is in its extended position, as best seen in FIG. 2B, the upper portion 38 of the elongated tab body 36 projects, e.g., generally orthogonally, from the top surface of the upper platform 30, whereas the lower portion 40 of the tab 28 presses against the inner sidewall 33A, 33B of a respective cup receptacle 32A, 32B. For instance, as a container C1, C2 is inserted into a cup receptacle 32A, 32B, the bottom end of the container C1, C2 presses on the lower portions 40 of the elongated tab bodies 36 of that receptacle's tabs 28. In so doing, the tabs 28 are thereby pivoted about respective axes A1 to an extended position (FIG. 2B) such that the tabs 28 now press against or otherwise barricade the periphery of the container C1, C2. The lower pocket portion 47A, 47B of each tab pocket 46A, 46B, which is recessed from the inner wall 33A, 33B of a respective cup receptacle 32A, 32B, nests therein the lower portion 40 of an extended tab 28. With this arrangement, the lower portion 40 of each extended retainer tab 28 is recessed below or lays flush with the inner periphery of a corresponding cup receptacle 32A, 32B. By incorporating the retainer tabs 28 into the cup holder assembly 20, the functional height of a relatively shallow cup receptacle 32A, 32B (e.g., one with a depth of approximately 30-40 mm) can be selectively increased by 100% or more (e.g., with upper portions 38 that extend approximately 30-40 mm above the top surface of the upper platform 30 when the retainer tab 28 is in the extended position).

When either of the cup receptacles 32A, 32B is not in use, the retainer tabs 28 can be disproportionately top-weighted to automatically pivot, under the force of gravity, to their retracted positions. As seen in FIG. 4, the upper portion 38 of the elongated tab body 36 has a first width W1, whereas the lower portion 40 has a second width W2 that is smaller than the first width W1. This characteristic increases the mass of the upper portion 38 of each tab 28. In addition, the upper portion 38 has a first length L1 that is longer than a second length L2 of the lower portion 40. This characteristic shifts the axis A1 of rotation closer to the lower end of the elongated tab body 36. With a wider and longer upper portion 38, the retainer tab 28 will automatically rotate back to the retracted position when the container C1, C2 is removed from the receptacle cup.

While aspects of the present disclosure have been described in detail with reference to the illustrated embodiments, those skilled in the art will recognize that many changes may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and features.

What is claimed:

1. A cup holder assembly for receiving and supporting a container in a motor vehicle having internal vehicle structure, the cup holder assembly comprising:
   a receptacle tray configured to attach to the internal vehicle structure of the motor vehicle, the receptacle tray including a platform and a cup receptacle recessed from the platform, the cup receptacle being configured to nest therein the container; and
   a plurality of retractable retainer tabs adjacent the cup receptacle and rotatably coupled to the receptacle tray, each of the retainer tabs being configured to pivot between a retracted position, whereat the retainer tab lays against the platform of the receptacle tray, and an extended position, whereat the retainer tab projects from the platform of the receptacle tray such that the retainer tab sits against the container.

2. The cup holder assembly of claim 1, wherein the cup receptacle has an upper opening through which the container is received, and wherein the retractable retainer tabs are spaced circumferentially around the perimeter of the upper opening of the cup receptacle.

3. The cup holder assembly of claim 1, wherein each of the retainer tabs includes an elongated tab body with an upper portion, a lower portion, and a pivot arm interposed between the upper and lower portions, the pivot arm rotatably coupling the retainer tab to the receptacle tray.

4. The cup holder assembly of claim 3, wherein the upper portion of the elongated tab body has a first width and the lower portion has a second width smaller than the first width.

5. The cup holder assembly of claim 3, wherein the upper portion of the elongated tab body has a first length and the lower portion has a second length smaller than the first length.

6. The cup holder assembly of claim 3, wherein the pivot arm includes first and second pivot arms projecting transversely from opposing sides of the elongated tab body, and wherein the receptacle tray includes first and second complementary slots into which the first and second pivot arms are respectively snap-locked into place.

7. The cup holder assembly of claim 3, wherein the upper portion of the elongated tab body projects generally orthogonally from the platform of the receptacle tray when the retainer tab is in the extended position.

8. The cup holder assembly of claim 3, wherein the lower portion of the elongated tab body presses against an inner wall of the cup receptacle when the retainer tab is in the extended position.

9. The cup holder assembly of claim 3, wherein the receptacle tray defines a plurality of tab pockets each including an upper pocket portion and a lower pocket portion, the upper pocket portion being recessed from the platform and configured to nest therein the upper portion of the elongated tab body, and the lower pocket portion being recessed from an inner wall of the cup receptacle and configured to nest therein the lower portion of the elongated tab body.

10. The cup holder assembly of claim 1, wherein the internal vehicle structure to which the receptacle tray attaches is an armrest rotatably mounted to a seatback, the armrest being configured to pivot between raised and lowered positions, and wherein the retainer tabs are configured to remain in the retracted position when the armrest is moved to the raised position.

11. The cup holder assembly of claim 1, wherein each of the retainer tabs, when in the retracted position, is recessed below or flush with a top-most surface of the platform of the receptacle tray.

12. The cup holder assembly of claim 1, wherein the cup receptacle has a depth of approximately 30-40 mm.

13. The cup holder assembly of claim 12, wherein each of the retainer tabs includes an upper portion of that extends approximately 30-40 mm above a top-most surface of the platform of the receptacle tray when the retainer tab is in the extended position.

14. The cup holder assembly of claim 1, wherein the cup receptacle comprises first and second cup receptacles positioned adjacent each other, and wherein the retainer tabs comprise first and second pluralities of retainer tabs adjacent the first and second cup receptacles, respectively.

* * * * *